(12) United States Patent  (10) Patent No.: US 8,340,081 B2
Salkintzis et al.  (45) Date of Patent: Dec. 25, 2012

(54) COMMUNICATION APPARATUS FOR PROVIDING SERVICES TO A COMMUNICATION DEVICE THROUGH A PRIVATE BASE STATION

(75) Inventors: Apostolis Kamal Salkintzis, Athens (GR); Irfan Ali, Istanbul (TR)

(73) Assignee: Motorola Mobility LLC, Libertyville, IL (US)

( * ) Notice: Subject to any disclaimer, the term of this patent is extended or adjusted under 35 U.S.C. 154(b) by 150 days.

(21) Appl. No.: 12/408,960

(22) Filed: Mar. 23, 2009

(65) Prior Publication Data

US 2010/0238920 A1  Sep. 23, 2010

(51) Int. Cl.
*H04L 12/28* (2006.01)
*H04L 12/66* (2006.01)
*G06F 15/173* (2006.01)

(52) U.S. Cl. ........ 370/352; 370/351; 370/353; 370/354; 370/355; 370/356

(58) Field of Classification Search .................. 370/310, 370/310.2, 352, 354, 351, 353, 355, 356
See application file for complete search history.

(56) References Cited

U.S. PATENT DOCUMENTS

| | | | | |
|---|---|---|---|---|
| 2004/0242260 | A1* | 12/2004 | Lescuyer ...................... | 455/525 |
| 2006/0040681 | A1* | 2/2006 | Julka et al. .................... | 455/458 |
| 2007/0041367 | A1* | 2/2007 | Mahdi ........................... | 370/352 |
| 2007/0165605 | A1* | 7/2007 | Nguyen et al. ................ | 370/352 |
| 2007/0191014 | A1* | 8/2007 | Zheng et al. .................. | 455/438 |
| 2007/0195754 | A1* | 8/2007 | Shaheen ....................... | 370/352 |
| 2009/0041246 | A1* | 2/2009 | Kitazoe ......................... | 380/270 |
| 2009/0093249 | A1* | 4/2009 | Zhu et al. ..................... | 455/433 |
| 2009/0305671 | A1* | 12/2009 | Luft et al. ..................... | 455/411 |
| 2010/0077459 | A1* | 3/2010 | Mahdi et al. .................... | 726/4 |
| 2010/0172323 | A1* | 7/2010 | Rexhepi et al. ............... | 370/331 |
| 2010/0215018 | A1* | 8/2010 | Ejzak ............................ | 370/331 |

OTHER PUBLICATIONS

3GPP TR 23.832: "IMS Aspects of Architecture for Home NodeB", Available Mar. 16, 2009, from http://www.3gpp.org/ftp/Specs/html-info/23832.htm.*
3GPP TSG SA WG2 Meeting #72, TD S2-091965 "Architectural Alternative for IMS-capable HNB: Reference Architecture" Motorola, Mar. 30-Apr. 3, 2009, Hangzhou, China, 4 pages.
3GPP TSG SA WG2 Meeting #72, TD S2-091966 "Architectural Alternative for IMS-capable HNB: Functional Description and Procedures" Motorola, Mar. 30-Apr. 3, 2009, Hangzhou, China, 5 pages.

(Continued)

*Primary Examiner* — Ayaz Sheikh
*Assistant Examiner* — Tarell Hampton
(74) *Attorney, Agent, or Firm* — Roland K. Bowler, II

(57) ABSTRACT

A communication apparatus provides services to a communication device. The communication apparatus comprises a private base station, such as a Home Node B, for communicating with a communication device authorized to use the private base station and a gateway, such as a Home Node B gateway, communicatively coupled to the private base station for providing access to an IP Multimedia Subsystem, IMS, network and at least one other communication network, such as a Circuit Switched, CS, network. The private base station is arranged to select a route for providing a service to the communication device through the private base station and gateway, the selected route being one of a route between the communication device and the IMS network and a route between the communication device and the at least one other communication network. The private base station is arranged to select a route based on the service to be provided.

16 Claims, 11 Drawing Sheets

OTHER PUBLICATIONS

Motorola: "Additional architectural requirements for IMS HNB", 3GPP Draft; S2-090937_IMS-HNB CSI Rerquirements, 3rd Generation Partnership Project (3GPP), Mobile Competence Centre; 650, Route des Lucioles; F-06921, Sophia-Antipolis Cedex; France, No. Budapest; 20090210, Feb. 10, 2010, all pages.

3rd Generational Partnership Project; Technical Specification Group Service and System Aspects; IMS Aspect of Architecture for Home NodeB; Stage 2, (Release 9):, 3GPP Standard; 3GPP TR 23.832, 3rd Generation Partnership Project (3GPP), Mobile Competence Centre; 650, Route des Lucioles; F-06921 Sophia-Antipolis Cedex; France No. V0.2.0, Mar. 1, 2009, pp. 1-13.

"3rd Generation Partnership Project; Technical Specification Group Services and System ASpects; Voice Call Continuity (VCC) between Circuit Switched (CS) and IP Multimedia Subsystem (IMS); Stage 2 (Release 7)", 3GPP Standard; 3GPP TS 23.206, 3rd Generation Partnership Project 93GPP), Mobile Competence Centre; 640, Route des Lucioles; F-06921 Sophia-Antipolis Cedex; France, No. V7.5.0, Dec. 1, 2007, pp. 1-36.

Motorola: "Achtecture for IMS-capable HNB", 3GPP Draft; S2-091702_WAS_0936_IMS-HNB Archtecture, 3rd Generation Partnership Project (3GPP), Mobile Competence Centre; 650, Route des Lucioles; F-06921 Sophia-Antipolis Cedex: France, No. Budapest; 20090220, Feb. 20, 2009, all pages.

Patent Cooperation Treaty, International Search Report and Written Opinion of the International Searching Authority for International Application No. PCT/US2010/026753, Oct. 5, 2010, 13 pages.

* cited by examiner

US 8,340,081 B2

COMMUNICATION APPARATUS FOR PROVIDING SERVICES TO A COMMUNICATION DEVICE THROUGH A PRIVATE BASE STATION

FIELD OF THE DISCLOSURE

This disclosure relates to a communication apparatus for providing services to a communication device through a private base station via an IP Multimedia Subsystem (IMS) network or another communication network such as a Circuit Switched (CS) network.

BACKGROUND

3rd generation (3G) systems, such as the Universal Mobile Telecommunication System (UMTS) have been developed and deployed to further enhance the communication services provided to mobile users compared to those communication services provided by the 2nd generation (2G) communication system known as the Global System for Mobile communication (GSM). In such 3G systems, distinct domains or networks have been identified for Radio Access Networks (RANs) which communicate with the mobile devices. These domains include the circuit switched (CS) domain and the packet switched (PS) domain. In the CS domain signals are physically routed to the appropriate destination through a unique connection whereas in the PS domain message packets are routed to the appropriate destination based on addresses in the packet. So for example, a UMTS CS domain is the UMTS RAN (known as UTRAN) and core network components that provide CS services and a UMTS PS domain is the UTRAN and core network components that provide PS services.

Other IP-based communication systems, such as wireless LAN (WLAN), Worldwide interoperability for Microwave Access (Wi-MAX), Wi-Fi, Long Term Evolution (LTE) systems, provide communication via a PS domain. An IP Multimedia Subsystem (IMS) is a subsystem of a communication system that provides IP multimedia services with PS communication (that is, via the PS domain).

As is well known, cellular communication systems, such as UMTS, provide communication to mobile devices via a plurality of cells, with each cell served by one or more base stations. The base stations are interconnected by a fixed network which can communicate data between the base stations. A mobile device communicates via a radio communication link with a base station of the cell within which the mobile station is situated. In UMTS, the base stations which are part of the UTRAN are known as Node Bs and a mobile device is known as User Equipment (UE).

In order to extend coverage and capacity indoors, such as in residential or small business environments and especially where access would otherwise be limited or unavailable, systems with smaller sized cells served by small base stations, known as femtocells, have been developed. The femtocell incorporates the functionality of a typical base station and some network functionality to allow a simpler, self contained implementation. Current femtocell designs can typically support two to four active mobile devices in a residential setting and thus, are typically used for a closed subscriber group (CSG) or private cell where only subscribers in the group may communicate via the femtocell (also known as private base station). Different architectures for femtocells have been proposed. For example, a UMTS femtocell architecture contains a Home Node B (HNB), a 3G HNB Gateway (3G HNB GW), which interfaces with the UMTS PS and CS domains. The third Generation Partnership Project (3GPP) refers to a 3G femtocell as a Home Node B (HNB) and is working currently to complete a new HNB standard for Rel-8 of specifications: see for example, the 3GPP document TS 25.467 (UTRAN Architecture for 3G HNB). In addition, 3GPP is working to specify an enhanced HNB architecture in the context of Rel-9: see for example, the 3GPP documents TR 23.830 and TR 23.832.

3GPP has defined architecture to support access to the PS domain and to the CS domain of one or more core networks through HNBs. FIG. 1 is a simplified diagram showing one HNB 10 serving a private cell 12, and a Node B (NB) 14 serving a larger cell 16 (referred to as a macro cell). UE 13 communicates with the HNB 10 over a radio communication link 15 and the HNB 10 communicates with a 3G HNB gateway 18 via a Iuh interface 20. NB 14 is coupled to Radio Network Controller (RNC) 22 as is well known in the art. Services are provided to the UE 13 via the CS domain 23 using the Iu-cs interface and the Mobile Switching Centre (MSC) 24. Services are provided to the UE 13 via the PS domain 25 using the Iu-ps interface and the Serving GPRS Support Node (SGSN) 26 and the Gateway GPRS Support Nodes (GGSN) or Packet Data Network Gateway (PGW) 28. For UEs having IMS capability, access to IMS services may be provided using IMS elements of the IMS 27, the Iu-ps interface and the SGSN 26 and the GGSN/PGW 28.

3GPP has recently started a new study item (TR 23.832) on "IMS aspects of architecture for Home Node B" which aims at specifying architectural solutions that enable an operator to offload CS traffic to the IMS. Operators expect the number of HNBs to increase significantly in the future and the minutes of usage per user to also increase significantly due to better coverage in-house and due to fixed-line replacements. To handle the increased voice traffic, the operator can either continue to invest in legacy CS networks or invest in carrying the traffic from the HNB to the IMS and thus, offload CS traffic from the existing CS networks.

BRIEF DESCRIPTION OF THE DRAWINGS

A communication apparatus for providing services to a communication device, a communication system and a method of providing services to a communication device, in accordance with the disclosure will now be described, by way of example only, with reference to the accompanying drawings in which.

DETAILED DESCRIPTION

The term service as used herein is intended to cover services for the end user of a communication device (e.g. originated or terminated at the communication device) and includes voice calls, video, audio or other multimedia sessions, file delivery services, bulletin board and broadcast notification services like news feed, web-surfing, network gaming, database access, email, SMS or similar services which provide the capability for information transfer. The disclosure will however be described in relation to voice calls for illustrative purposes.

The communication device may be a portable or handheld or mobile telephone, a Personal Digital Assistant (PDA), a portable computer, portable television and/or similar mobile device or other similar communication device. In the following description, the communication device will be referred to generally as a UE for illustrative purposes and it is not intended to limit the disclosure to any particular type of communication device.

Figure 2:
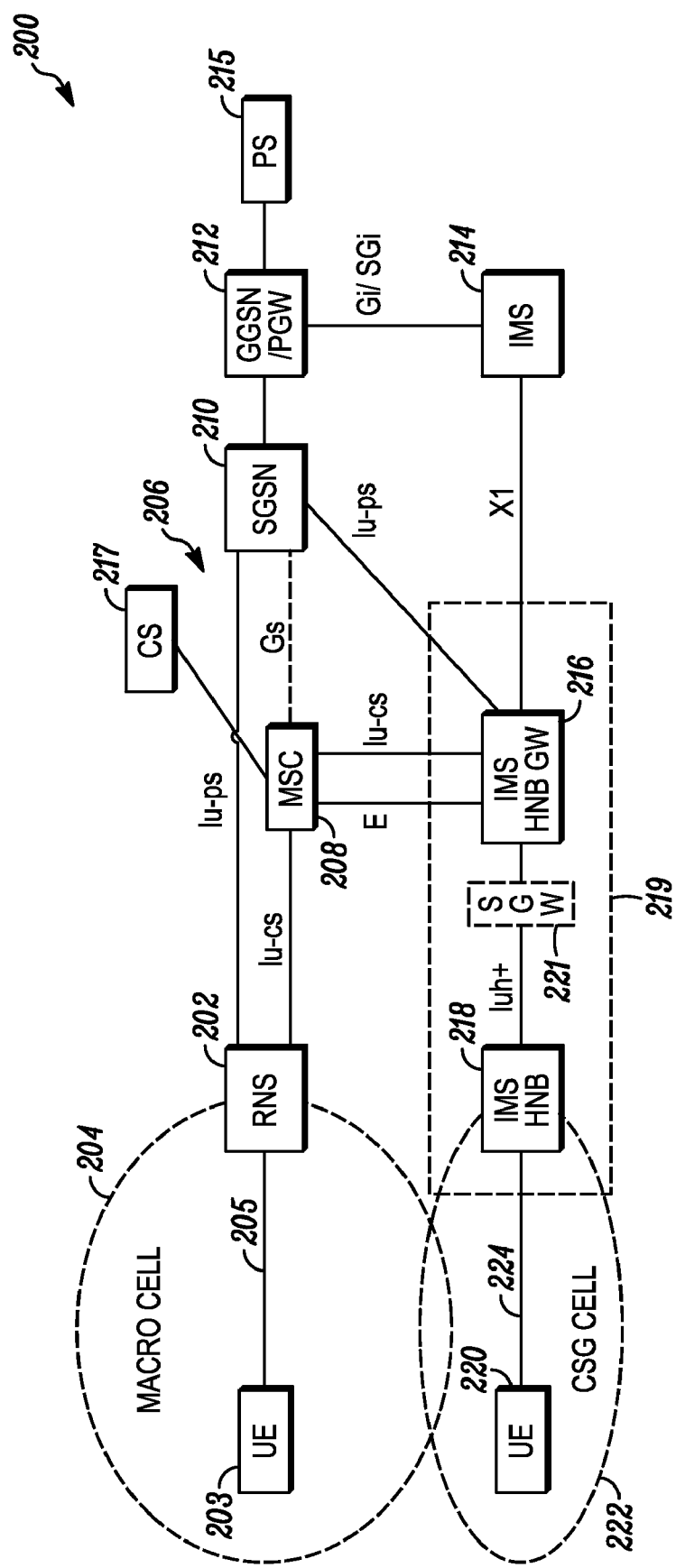
FIG. 2 is a block schematic diagram of a communication system in accordance with an embodiment of the present disclosure.

Referring now to FIG. 2, a communication system 200 in accordance with an example of an embodiment of the disclosure comprises a core network 206, an IP Multimedia Core Network Subsystem 214 (referred to as IMS network 214) having IMS elements for providing IMS services, at least one packet data network 215, a CS network 217, and Radio Network Subsystem (RNS) 202 including at least one Node B (not shown) and a Radio Network Controller (RNC) (not shown) for serving a macro cell represented by the dotted lines 204. RNS 202 is part of a UTRAN as is well known in the art. A UE 203 may communicate with a Node B of the RNS 202 via a radio communication link 205. The number and types of networks available to a UE is determined by what networks are deployed by the operator of the communication system 200. So, for example, an operator may not deploy a PS network.

Figure 1:
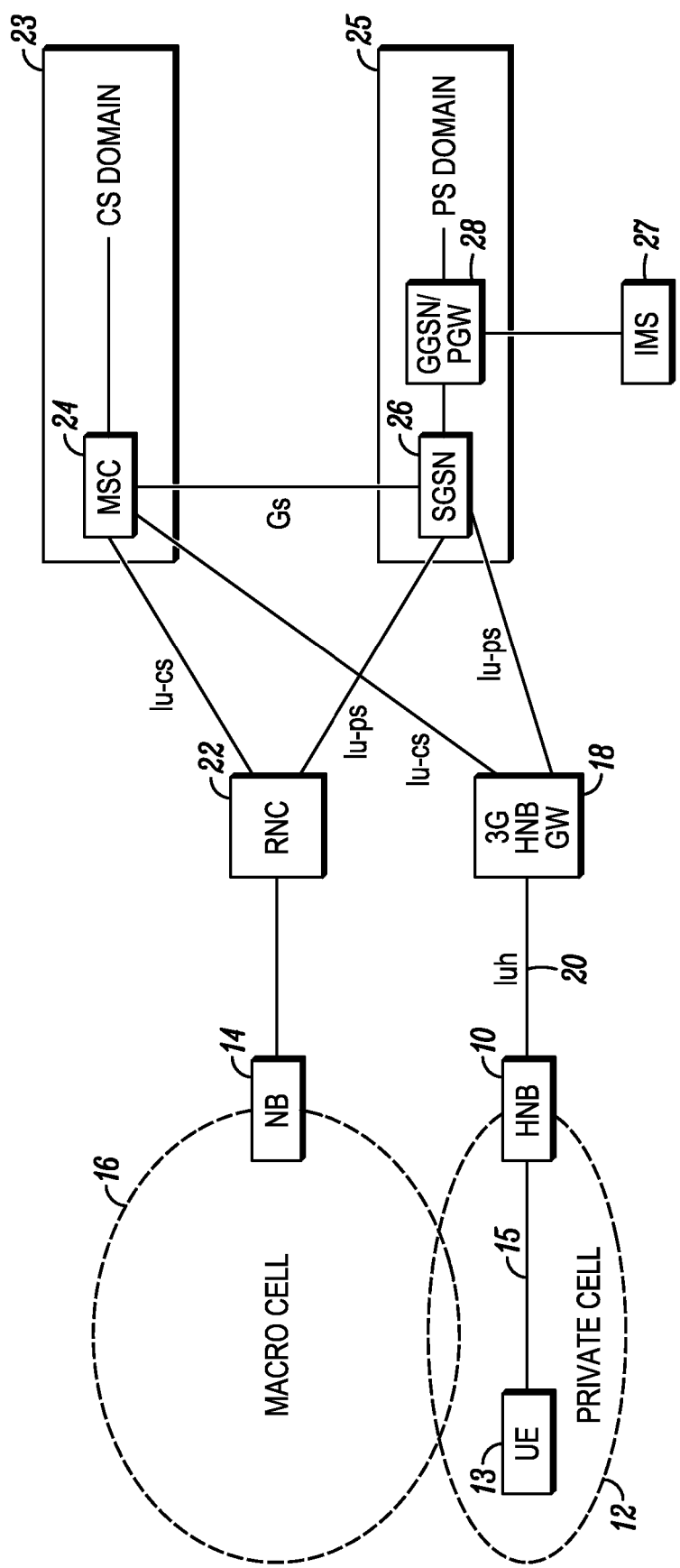
FIG. 1 is a block schematic diagram of a communication system including a Node B and a HNB for providing access to networks including an IMS network.

The core network 206 manages the radio access networks such as RNS 202 in order to provide services to or from a UE. The services may include IMS services from the IMS network 214 or data services from the packet data network 215. The core network 206 is divided into a plurality of domains including a CS domain, and a PS domain. The CS domain includes a MSC 208 and Iu-cs interfaces, and the PS domain includes a SGSN 210, GGSN/PGW 212 and Iu-ps interfaces. A UE in the macro cell 204 may access the IMS network 214 through the Iu-ps interface, the SGSN 210, GGSN 212 and Gi/SGi reference point or interface. A UE in the macro cell 204 may access the packet data network 215 through the Iu-ps interface, the SGSN 210, and GGSN 212. A UE in the macro cell 204 may access the CS network 217 through the Iu-cs interface, and the MSC 208. FIG. 1 shows a Gn/Gp SGSN 210, that is, a SGSN with a Gn/Gp interface to GGSN/PGW 212. In an alternative arrangement, an S4 SGSN can also be used if deployed by the operator. In such case, the SGSN connects with a Serving GateWay (SGW) through the S4 interface and the Serving GateWay connects with the packet data network gateway (PGW) through the S5/S8 interface as specified in 3GPP specification TS 23.401.

The functions of the MSC 208, SGSN 210 and GGSN/PGW 212 and the interfaces Iu-ps and Iu-cs are well known in the art and no further description of their functions will be provided herein.

The communication system 200 further comprises a communication apparatus 219 comprising a private base station 218 for communicating with a UE 220 of an user authorised to use the private base station 218 and a gateway 216 communicatively coupled to the private base station 218. The UE 220 communicates with the private base station 218 via a radio communication link 224 when the UE 220 is in a private cell 222 served by the private base station 218. The private base station 218 may be a HNB as defined in the 3GPP standards with the private cell 222 being a Closed Subscriber Group (CSG) cell and the gateway 216 being a HNB gateway. In order for the user of the UE 220 to be able to use the HNB 218, the user must be a subscriber to the CSG. In the following to simplify the description, the private base station 218 is referred to as IMS HNB 218, the gateway 216 is referred to as IMS HNB gateway 216 and the communication apparatus 219 comprising the IMS HNB 218 and IMS HNB gateway 216 is referred to as the IMS HNB subsystem 219. It will however be appreciated that the use of this language is not intending to limit the scope of the disclosure.

The IMS HNB gateway 216 may provide access to the IMS network 214 and at least one other communication network. For example in the communication system 200 of FIG. 2, the IMS HNB gateway 216 may provide access to the CS network 217 via the CS domain and/or the packet data network 215 via the PS domain. In order to provide access to the CS network 217, the IMS HNB gateway 216 may communicate with the MSC 208 over a Iu-cs interface and in order to provided access to the PS network 215, the IMS HNB gateway 216 may communicate with the SGSN 210 over a Iu-PS interface. The IMS HNB gateway 216 is communicatively coupled to the IMS network 214 so as to provide direct access to the IMS network 214 via a reference point or interface referred to as an X1 interface. The X1 interface may be a Session Initiation Protocol (SIP) based interface that provides access to the IMS network 214 directly from the IMS HNB subsystem 219. The X1 interface is used by the IMS HNB subsystem 219 to register the UE 220 to the IMS network 214 and to provide services to the UE 220 (originated/terminated by the UE 220) via the IMS network 214 as will be described in more detail below. The X1 interface may for example be implemented by an existing reference point such as that shown in TS 23.228. The description of the other interfaces shown in FIG. 2 can be found in TS 23.060 and TS 23.002. The disclosures of these documents are incorporated herein by reference. The IMS HNB gateway 216 may also communicate with the MSC 208 over an interface referred to as an E interface. The E interface between the MSC 208 and the IMS HNB gateway 216 is used to transfer an ongoing service (such as a voice call) from the IMS HNB subsystem 219 to the MSC 208 as will be described in more detail below. The handover procedure may be identical to the inter-MSC handover procedure specified in TS 23.009. The disclosure of this document is incorporated herein by reference.

The IMS HNB 218 is arranged to select a route for providing a service to the UE 220 through the IMS HNB 218 and IMS HNB gateway 216, with the route being one of a route between the UE and the IMS network 214 and a route between the UE and at least one other network, such as the CS network 217. The IMS HNB 218 may select the route based on the service to be provided. In other words, the IMS HNB 218 may select the route based on the service originated by the UE 220.

Thus, for example when the IMS HNB 218 receives a request for service from the UE 220, the IMS HNB 218 may determine that the service can be provided by the IMS network 214 and the IMS HNB 218 may then take control of the provision of the service and select a route via the IMS network 214. In the case of a request for a voice call, the IMS HNB 218 takes control of the call from the MSC 208 and so the MSC 208 is no longer involved with the call.

Figure 3:
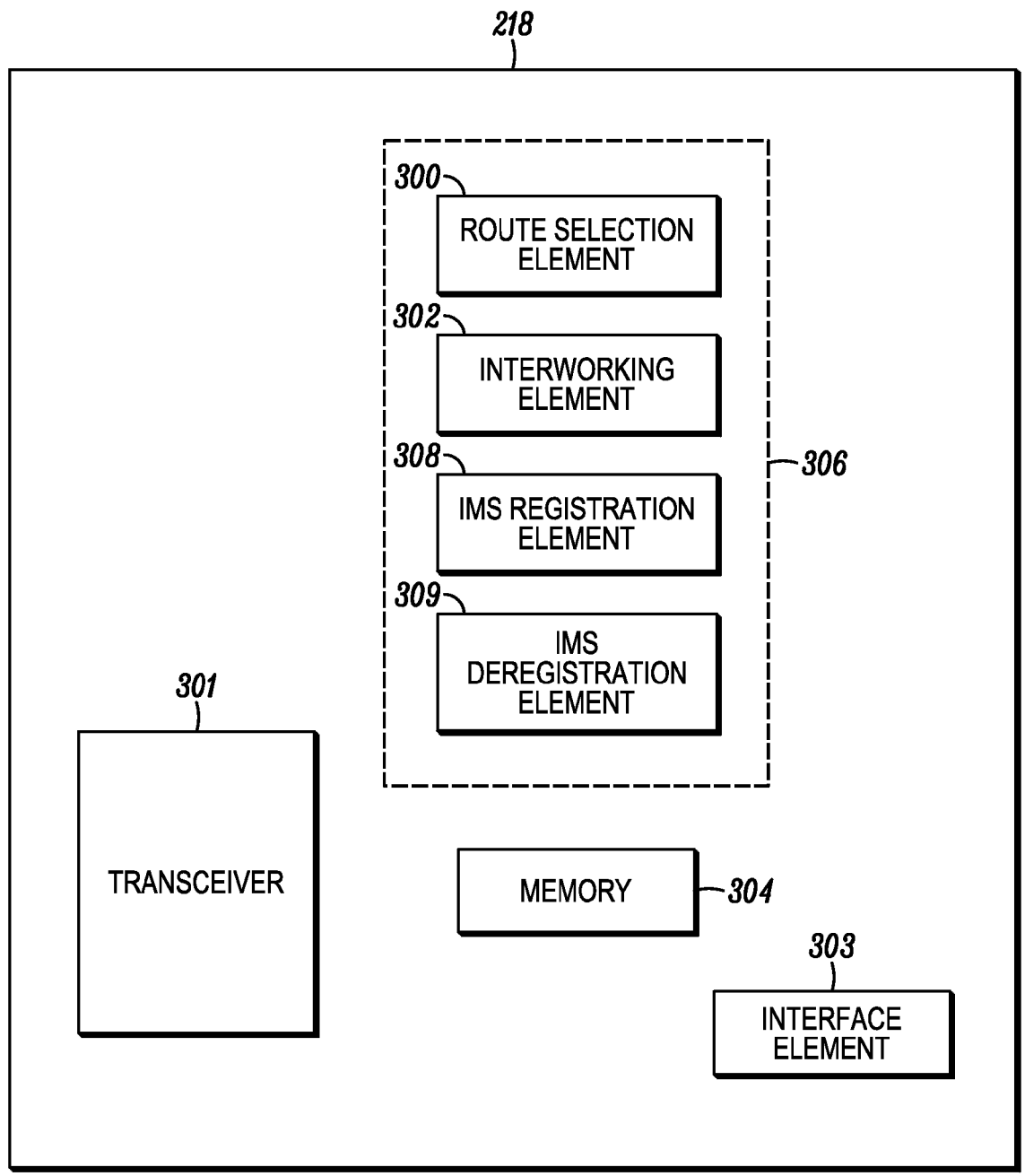
FIG. 3 is a block schematic diagram of a private base station in accordance with an example of an embodiment of the present disclosure for use in the communication system of FIG. 2.

Referring now to FIG. 3 which shows a simplified schematic diagram of an example implementation of IMS HNB 218 in accordance with an embodiment of the disclosure. IMS HNB 218 includes a transceiver 301 for receiving and transmitting signalling between the UE 220 and the IMS HNB 216, for example over the radio communication link 224, an interface element 303, which is part of an interface (referred to as Iuh+) between the IMS HNB 218 and the IMS HNB gateway 216 for communicating signalling between the IMS HNB gateway 216 and IMS HNB 218, a route selection element 300 for selecting a route for providing a service, an interworking element 302 for providing interworking functionality that interworks the UE signalling over the radio communication link 224 (such as the CS signalling as defined by TS 24.008, the disclosure of which is incorporated herein by reference) with the IMS signalling over the X1 interface, an IMS registration element 308 and a memory 304. The functionality of the interworking element 302 may be similar to the interworking functionality provided by an MSC Server enhanced for IMS Centralised Services (ICS), as specified in TS 23.292, the disclosure of which is incorporated herein by reference. A function of the interworking element 302 may include translating the IMS signalling to the CS signalling used by the UE. The IMS registration element 308 is arranged to provide an IMS identity for a UE, register the IMS identity with the IMS network 214 and store IMS registration information in the memory 304. Other UE related information such as International Mobile Subscriber Identity (IMSI), security keys, Temporary Mobile Subscriber CS identity (TMSI), etc may also be stored in the memory 304. The IMS registration information facilitates the IMS HNB 218 in providing a service to the UE via the IMS network 214 and the X1 interface.

The IMS HNB 218 may therefore intercept the CS signalling between the UE 220 and the MSC 208. The route selection element 300 may select the route for serving a service request. For example, the route selection element 300 may decide which service requests can be served in the CS domain and which can be served in the IMS network 214. In the event the service request cannot be provided by IMS, the service request is forwarded to the MSC 208 and in the event the service request can be provided by the IMS, the IMS HNB 218 assumes control of the service request to facilitate the provision of the service to the UE via the IMS network.

The route selection element 300, interworking element 302 and IMS registration element 308 are shown in FIG. 3 as being part of a processing unit 306 which controls the operation of the IMS HNB 218. They may for example be stored in a program memory (not shown) of the processing unit 306 in which is stored programs containing processor instructions for operation of the IMS HNB 218. It will however be appreciated that this is for illustrative purposes only. The processing unit 306 may be a single processor or may comprise two or more processors carrying out the processing required for operation of the IMS HNB 218. The number of processors and the allocation of processing functions to the processor is a matter of design choice for a skilled person. The memory 304 is shown as being separate to the processing unit 306 but may alternatively be part of the processing unit 306.

Since the IMS HNB gateway 216 is communicatively coupled to the IMS network 214 to provide direct access to the IMS network 214 over the X1 interface and the IMS HNB 218 includes the interworking element 302, the IMS HNB gateway 216 and the IMS HNB 218 in an example implementation are arranged to have IMS capability to facilitate the provision of services to the UE via the IMS network 214.

The type of signalling used by the UE for originating or terminating services through the IMS HNB 218 over the radio communication link 224 depends on the capability of the UE 220. For an UE having IMS capability, the UE 220 may use IMS signalling as defined in TS 24.229, the disclosure of which is incorporated herein by reference. For an UE having no IMS capability, the UE 220 may typically use CS signalling (based on TS 24.008). For UEs with IMS capability, access to the IMS domain of the IMS network 214 is provided through the IMS HNB subsystem 219, the SGSN 210, the GGSN/PGW 212 and the Gi/SGi interface as is well known in the art. For UEs with no IMS capability and for example using CS signalling to originate/terminate CS services, access to the IMS network 214 may be provided through the IMS HNB subsystem 219 and the X1 interface.

The Iuh+ interface between the IMS HNB 218 and IMS HNB gateway 216 supports signalling between the IMS HNB 218 and IMS HNB gateway 216 which may include signalling for handover initiation and preparation from the CSG cell 222 towards a macro cell 204 and signalling for triggering IMS deregistration when the UE leaves the CSG cell 222 and moves to a macro cell 204. The Iuh+ reference is to indicate that this interface may be an Iuh interface (defined in the current 3GPP specifications such as TS 25.467, 25.468, 25.469, the disclosures of which are incorporated herein by reference) that is modified to support the additional signalling. The modifications enable the IMS HNB subsystem 219 to provide services to the UE 220 directly via the IMS network 214. New protocols are supported by the Iuh+interface as shown in FIGS. 4-7.

The IMS HNB gateway 216 may be arranged to: implement a SIP Back-to-Back User Agent (B2BUA) functionality acting between the IMS HNB 218 and the IMS network 214; become a user plane anchor for all services provided by IMS; perform an inter-MSC handover to the CS domain when the UE moves out of the CSG cell 222; and deregister the UE 220 from the IMS when the UE moves out of the CSG cell 222.

The IMS HNB subsystem 219 may further comprise an IMS deregistration element 309 for initiating IMS deregistration whereby the IMS identity of the UE 220 is deregistered with the IMS network 214 after the UE 220 leaves the CSG cell 222 defined by the IMS HNB 218. The IMS deregistration process may also include the IMS registration information for the UE 220 being deleted from the memory 304 of the IMS HNB 218. The IMS HNB 218 may include an IMS deregistration element 309 as shown in FIG. 3. FIG. 3 shows the IMS deregistration element 309 as part of the processing unit 306 like elements 300, 302 and 308. However, the IMS deregistration element 309 may be separate to the processing unit 306. In addition or alternatively, the IMS HNB gateway 216 may include an IMS deregistration element (not shown). The IMS deregistration element of the IMS HNB gateway 216 may be arranged to initiate IMS deregistration when an ongoing service finishes or when no service is ongoing, may be arranged to initiate IMS deregistration in response to the IMS HNB gateway 216 receiving a notification that the UE 220 is located in another cell e.g. macro cell 204 defined by another communication network.

The IMS HNB subsystem 219 may further comprise a Security GateWay (SGW) element 221 which is used to verify whether an IMS HNB is authentic and authorised to communicate with the IMS HNB gateway 216.

Although not shown in FIG. 2, the core network will also include a Visitor Location Register (VLR) and Home Subscriber Server (HSS) which elements are shared by both the PS and CS domains.

Figure 4:
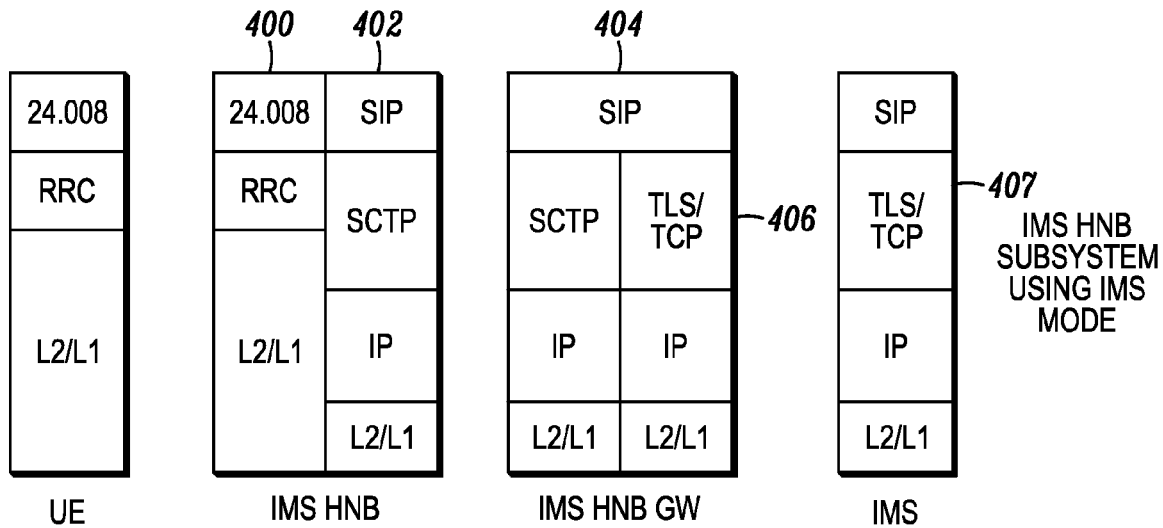
FIGS. 4-7 are simplified diagrams representing the control and user plane protocol architectures for different elements of the communication system of FIG. 2 during different communication routes.

FIG. 4 shows an example of a control plane protocol architecture for an IMS HNB subsystem 219 using an IMS mode. In other words, FIG. 4 shows the functionality of each of the main elements in a communication path once the IMS HNB 218 has selected a route between the UE and the IMS network 214 via the X1 interface. As can be seen by blocks 400 and 402, the IMS HNB 218 translates the UE CS signalling according to TS 24.008 to SIP signalling for use in the IMS network 214. With respect to block 404, the IMS HNB gateway 216 behaves as a SIP B2BUA and stays in the IMS control and user-plane path. When a voice call is handed over to the CS domain, the IMS HNB gateway 216 releases the SIP leg with the IMS HNB 218. Blocks 406 show TLS/TCP in the signalling path between the IMS HNB gateway 216 and the IMS network 214 but other protocols could be used.

Figure 5:
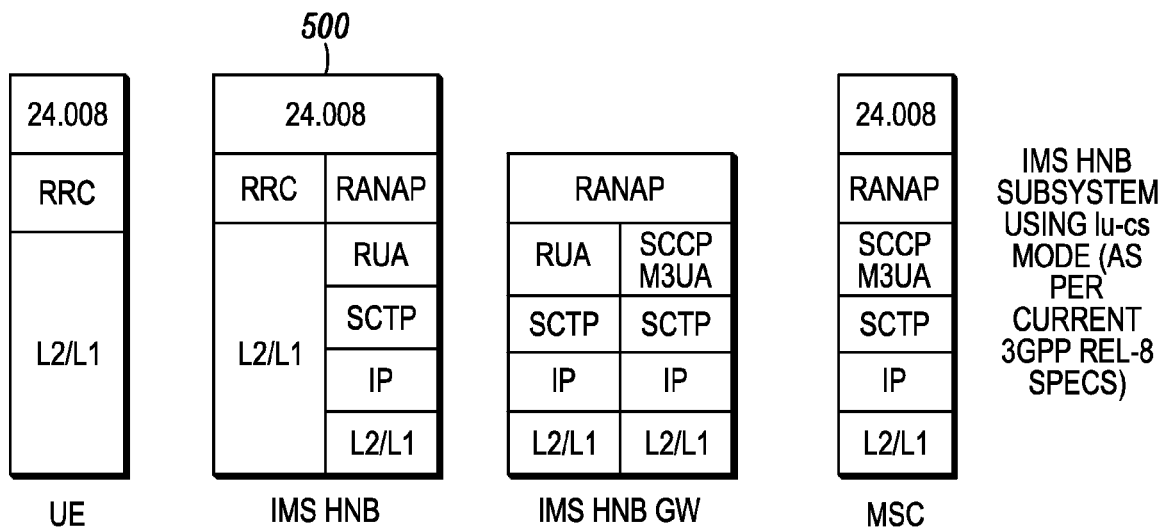

FIG. 5 shows an example of a control plane protocol architecture for an IMS HNB subsystem 219 using an Iu-cs mode as per current 3GPP Rel-8 specifications. In other words, FIG. 5 shows the functionality of each of the main elements in a communication path once the IMS HNB 218 has selected a route between the UE and the CS domain via the MSC 208. It is noted with respect to block 500, that the IMS HNB 218 intercepts messages between the UE and MSC 208 and may be arranged to forward messages to the MSC 208 only when needed. For example, when the UE 220 requests a voice service that can be served by the IMS network 214, the IMS HNB 218 processes itself the UE signalling (instead of forwarding it to the MSC 208) and requests the voice service to be provided by IMS network 214 through the X1 interface. In another example, when the UE 220 requests a fax service that cannot be served by the IMS network 214, the IMS HNB 218 forwards all UE signalling to the MSC 208 through the Iu-cs interface and the fax service is provided by the CS domain.

Figure 6:
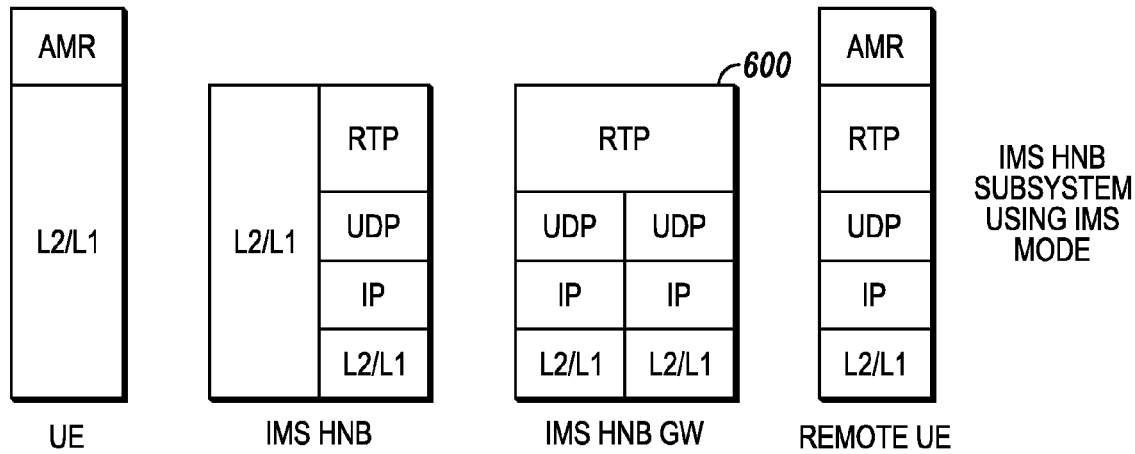

FIG. 6 shows an example of a user plane protocol architecture for an IMS HNB subsystem 219 using an IMS mode. In other words, the protocol architecture once the IMS HNB 218 has selected a route between the UE and the IMS network 214 via the X1 interface. It is noted with respect to block 600, that the IMS HNB gateway 216 may implement the Real Time Protocol (RTP) when it serves as a user plane anchor. For example, when a voice call is handed over to a macro cell (such as cell 204), the RTP stream terminates to the IMS HNB gateway 216. This will be explained in more detail below. This can be useful for supporting Lawful Interception (LI).

Figure 7:
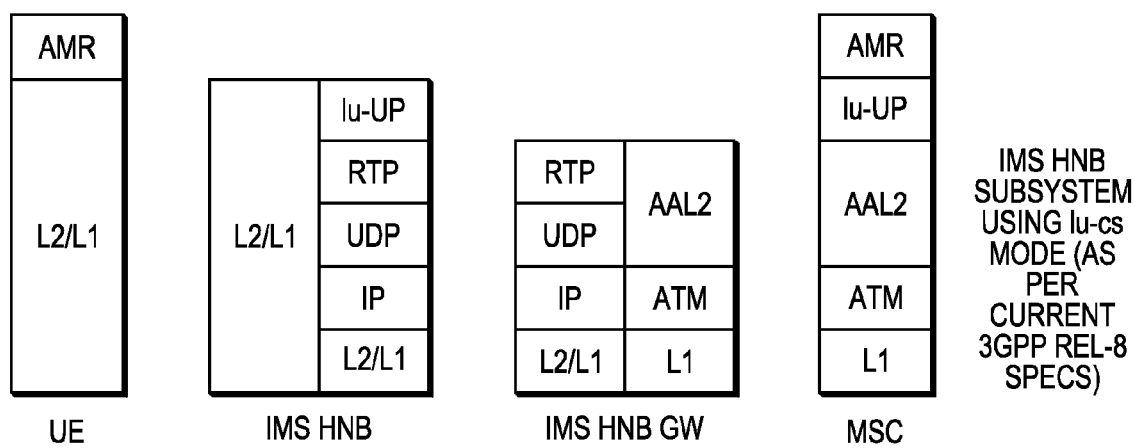

FIG. 7 shows an example of a user plane protocol architecture for an IMS HNB subsystem 219 using an Iu-cs mode. In other words, the protocol architecture once the IMS HNB 218 has selected a route between the UE and the CS domain via the MSC 208.

Figure 8:
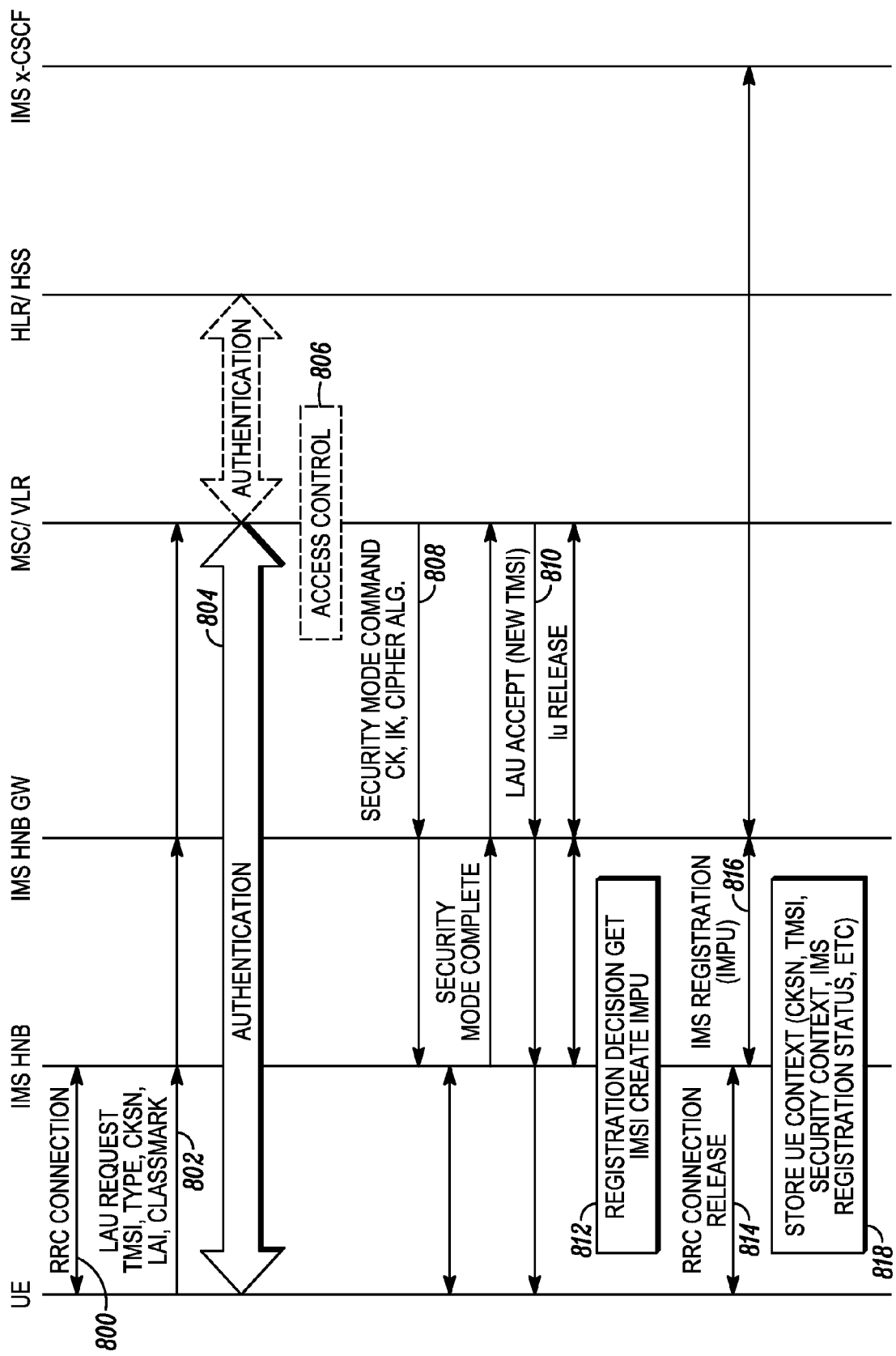
FIG. 8 is a diagram showing an example message flow for location updating of a communication device in the communication system of FIG. 2.
Figure 9:
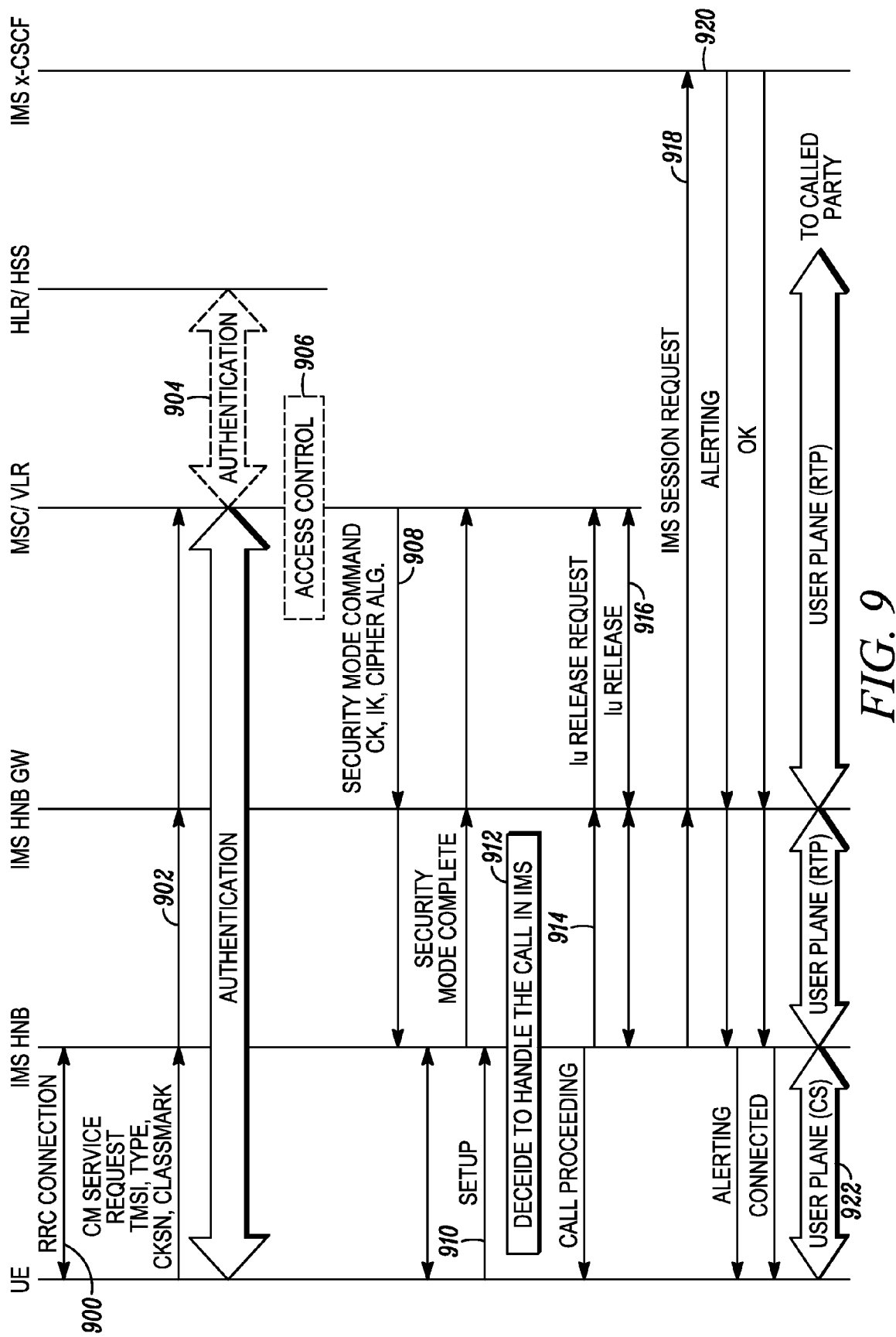
FIG. 9 is a diagram showing an example message flow for a voice call originated at a communication device in the communication system of FIG. 2.
Figure 10:
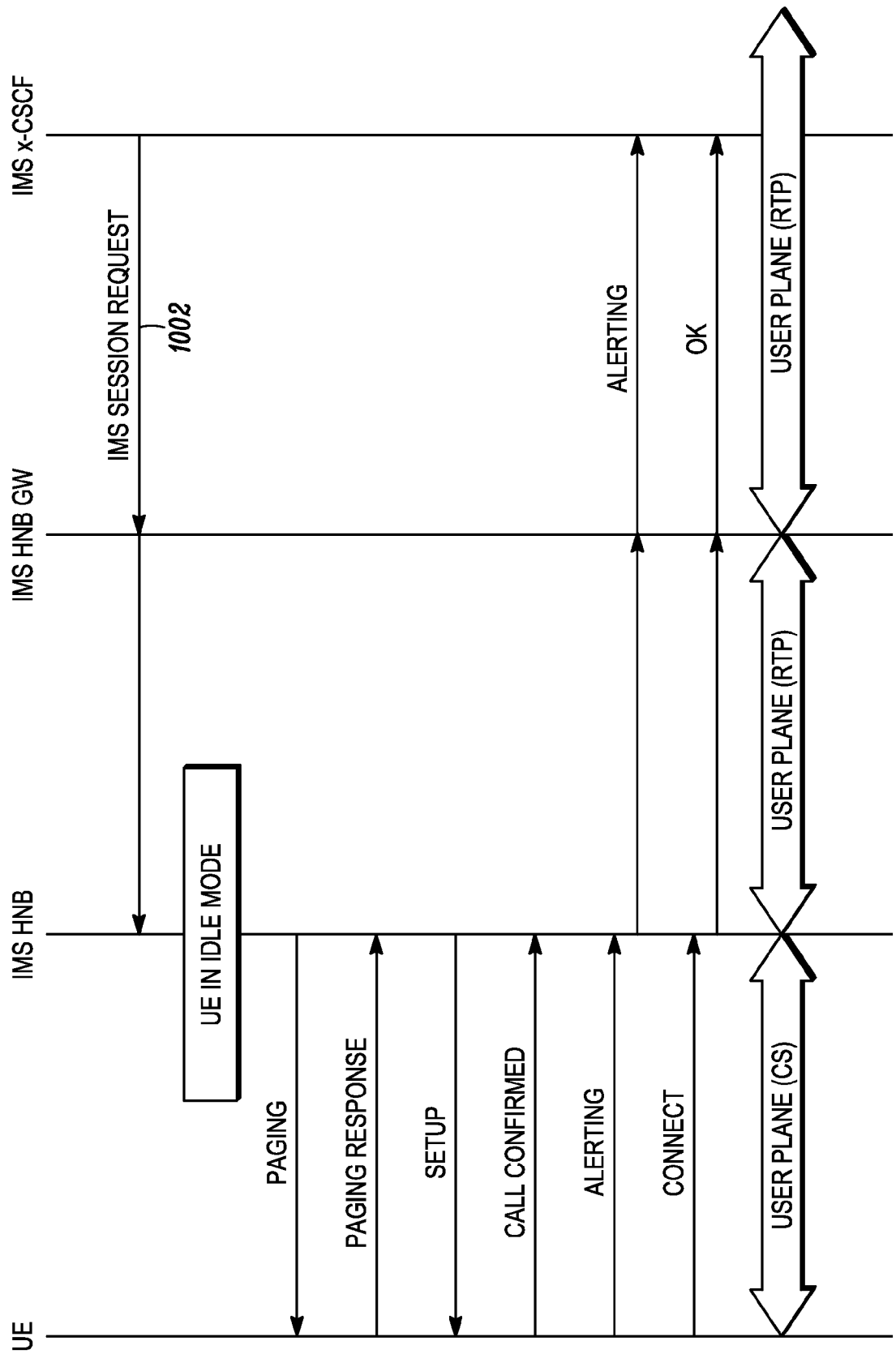
FIG. 10 is a diagram showing an example message flow for a voice call terminated at a communication device in the communication system of FIG. 2.
Figures 11, 11A, 11B:
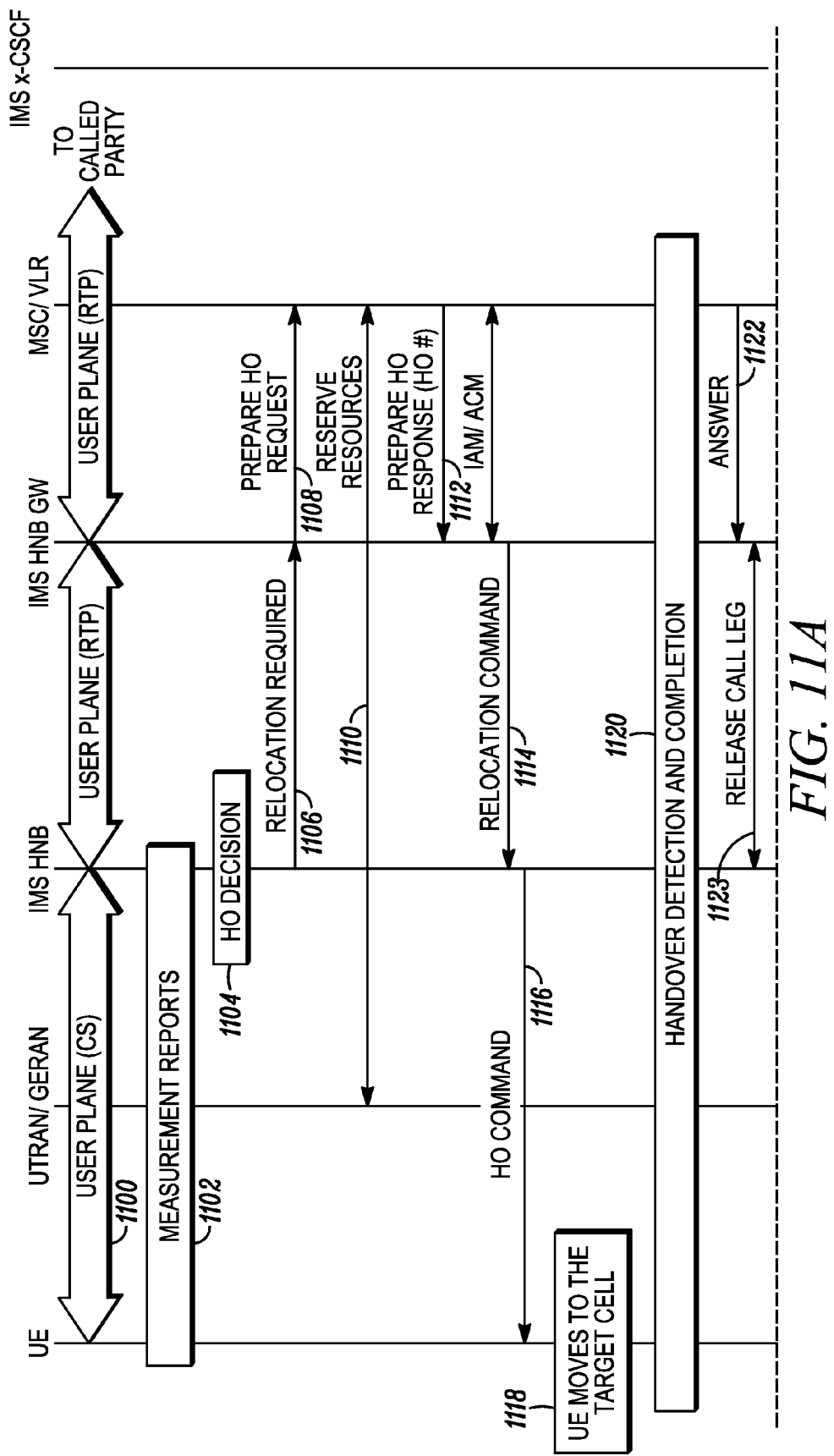
FIG. 11 is a diagram showing an example message flow for a voice call transfer from the private base station to a macro cell in the communication system of FIG. 2.
Figure 11B:
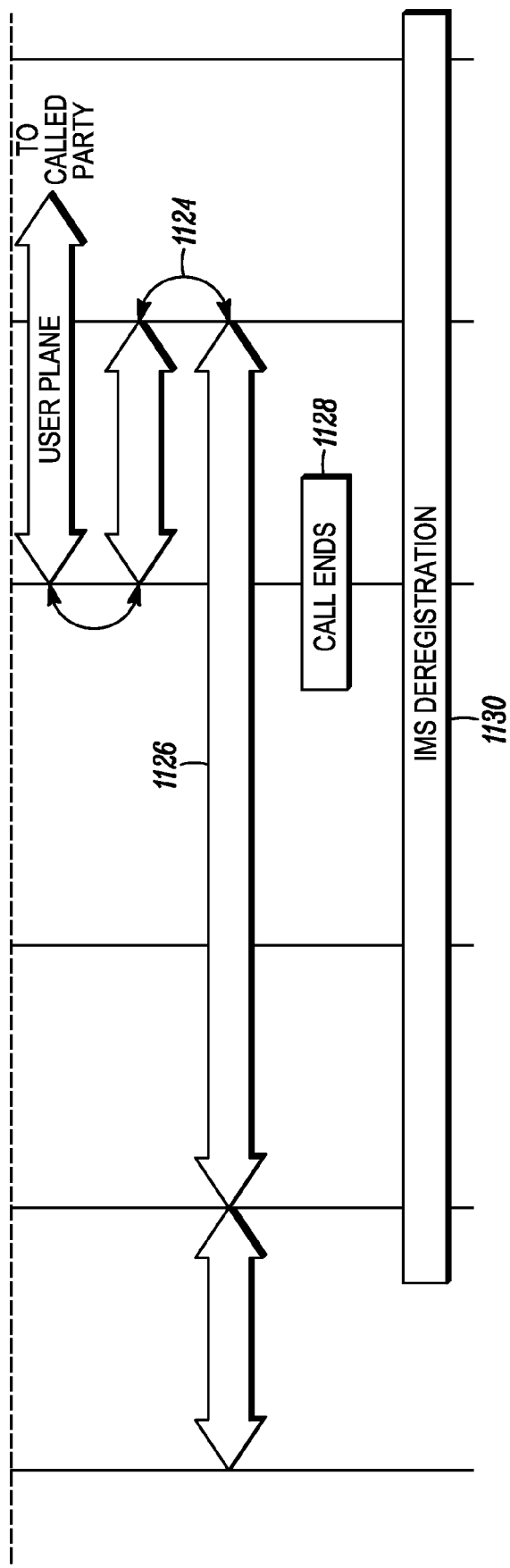
Figure 12:
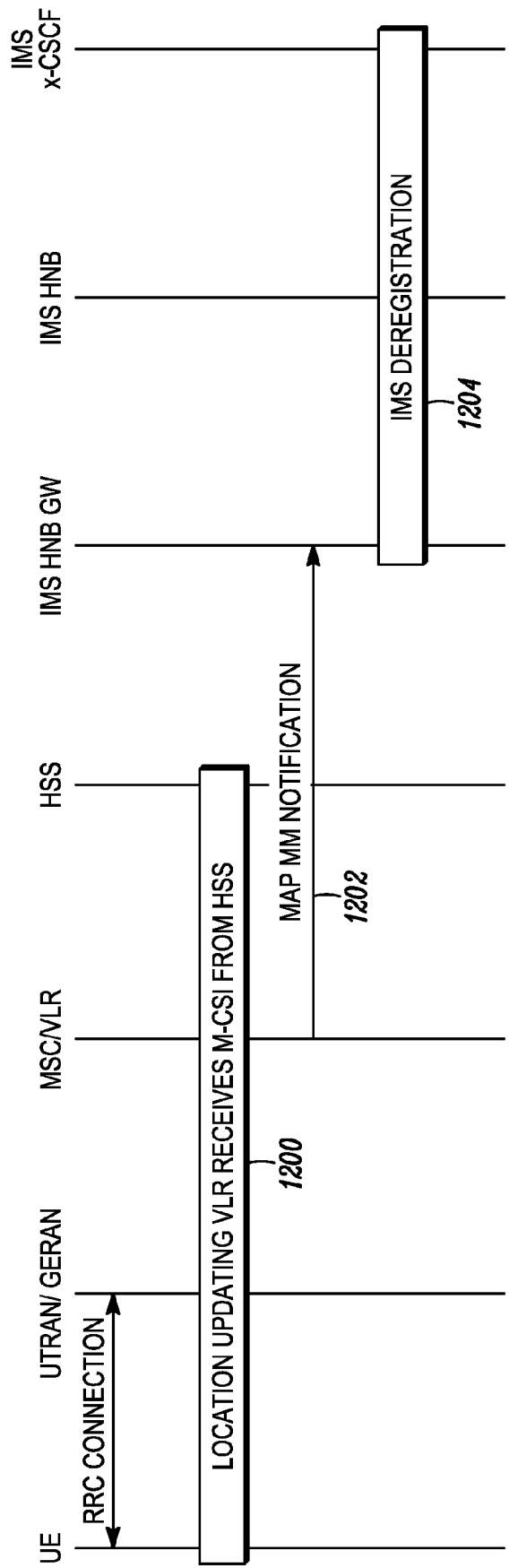
FIG. 12 is a diagram showing an example message flow for IMS deregistration.

In order to more fully understand the architecture and operation of the IMS HNB subsystem 219 in accordance with the disclosure, the message flows for some example use cases will now be described. FIG. 8 shows an example message flow for location updating. FIG. 9 shows an example message flow for a voice call originated at the UE 220. FIG. 10 shows an example message flow for a voice call terminated at the UE 220. FIG. 11 shows an example message flow for a voice call transfer from the IMS HNB subsystem 219 to a UTRAN/GERAN macro cell (such as 202, 204). FIG. 12 shows an example message flow for IMS deregistration. Although the examples are described in relation to a voice call service, it will be appreciated that the message flows shown will be similar for other services, such as fax and messaging services.

Referring firstly to FIG. 8, based on the normal cell selection and reselection procedures, the UE 220 decides to camp on (attach to) a CSG cell 222. This may happen either when the UE 220 is powering up or when the UE moves from a macro cell (such as cell 204) to the CSG cell 222. The UE establishes a normal Radio Resource Control (RRC) connection with the IMS HNB 218, step 800. The UE 220 then sends, at step 802, a Location Area Updating (LAU) Request as per TS 23.060, the disclosure of which is incorporated herein by reference. The LAU Request includes information such as Temporary Mobile Subscriber Identity (TMSI), Type, Ciphering Key Sequence Number (CKSN), Location Area Identification (LAI), Class mark as per current 3GPP specifications (for example, TS 23.060 and TS 24.008). The IMS HNB 218 receives the LAU Request and decides to forward this message to the MSC 208 via the IMS HNB gateway 216 and the Iu-cs interface. Normally, the IMS HNB 218 forwards all mobility management (MM) signalling to the MSC 208 so the MSC 208 can perform the normal CSG access control functions and can create a MM context for the UE 220. As per normal procedures, the MSC 208 may decide to authenticate the UE 220, step 804, by way of the VLR and HSS. If the UE is also a Rel-8 UE (that is a CSG-capable UE compliant with Rel-8 specifications), the MSC 208 performs access control, at step 806, as specified in TR 23.830, the disclosure of which is incorporated herein by reference, in order to confirm that the user of the UE 220 is allowed to use the selected CSG cell 222.

In the case when the UE 220 is correctly authenticated and authorized to use services in the selected CSG cell 222, the normal Security Mode procedure is executed and a security context for this UE is created and stored in the IMS HNB 218 (e.g. in memory 304), step 808.

At step 810, a LAU Accept message is sent by the MSC 208 and is received by the IMS HNB 218, which forwards this message to the UE 220. The IMS HNB 218 then decides, at step 812, if an IMS registration for this UE should be performed. This decision may be based, for example, on whether there is already an IMS registration for this UE in which case IMS registration information for the UE will be stored in the memory 304 of the IMS HNB 218, and/or whether the operator of the communication system 200 allows this UE to use IMS services via the IMS HNB 218.

At step, 814, the IMS HNB 218 releases the RRC connection. If the IMS HNB 218 decides to register the UE 220 to the IMS network 214, it retrieves the International Mobile Subscriber Identity (IMSI) of the UE (e.g. by initiating the Identity Check procedure specified in TS 23.060) and then creates an IMS identity, such as an IP Multimedia Public Identity (IMPU) as specified in TS 23.003 (the disclosure of which is incorporated herein by reference), that is used to perform the IMS registration. The IMS HNB 218 then sends a IMS registration request including the IMPU to the IMS (e.g. to a Call Session Control Function (CSCF) of the IMS). The IMS HNB gateway 216 may provide SIP Back-to-Back User Agent (B2BUA) functionality and remain in the IMS signalling path. If the IMS registration is successful, the IMS HNB 218 stores in memory 304 IMS registration or context information for this UE (e.g. including TMSI, CKSN, LAI, IMS Registration status, etc) so that it can later handle CS signalling with this UE (according to TS 24.008) without involving the MSC 208.

The steps 816 and 818 are performed by the IMS HNB 218 under the control of the IMS registration element 308. By performing an IMS registration and obtaining an IMPU, the IMS HNB 218 may therefore select under the control of the route selection element 300 and enable a service to be provided to the UE 220 via the IMS network 214 and the X1 interface and can thus 'steal' the service from the MSC 208.

Referring now to FIG. 9, the UE 220 located in the CSG cell 222 decides to initiate a voice call by using the normal procedures such as those defined for Call Control (CC) in TS 24.008. The UE 220 establishes a normal RRC connection with the IMS HNB 218 at step 900.

The UE 220 sends a Connection Management (CM) Service Request as per TS 23.060 in step 902. The IMS HNB 218 receives the CM Service Request and decides to forward this message to the MSC 208, e.g. in order to perform access control. As per normal procedures, the MSC 208 may decide to authenticate the UE 220, step 904. If the UE 220 is also a Rel-8 UE, the MSC 208 performs access control at step 906, as specified in TR 23.830 in order to confirm that the user of the UE is allowed to use services in the selected CSG cell 222.

In the case when the UE 220 is correctly authenticated and authorized to use services in the selected CSG cell 222, the normal Security Mode procedure is executed by the MSC 208 and a security context for this UE is created and stored in the IMS HNB 218 (e.g. in memory 304), step 908.

The UE 220 then, at step 910, sends a Setup message that contains the Bearer Capabilities of the impending voice call and the Mobile Station International Subscriber Directory Number (MSISDN) of the called party, as per TS 24.008.

At step 912, the IMS HNB 218 then selects under the control of the route selection element 300 a route for providing the service to the UE 220 by deciding, for example, if the requested service can be provided by the IMS network 214. If the requested service can be provided by IMS and if the UE has been registered with the IMS network 214 such that IMS registration information exists for this UE in memory 304, the IMS HNB 218 decides to take over the control of this call and release the Iu signalling connection so that the MSC 208 is not further involved with this call. This decision may be based for example on the service requested by the UE (e.g. voice, fax, messaging etc) and the services supported by the IMS network 214.

In this case, the MM context in the MSC 208 transits to Idle mode and the MSC 208 will page the UE 220 (via the IMS HNB 218) to deliver subsequent Mobile Terminated (MT) services. If a paging message arrives to the IMS HNB 218 and the UE 220 is in active mode in the middle of a voice call, the IMS HNB 218 needs to respond to the paging message on behalf of the UE 220. It is noted however that this scenario should not be likely to happen because the network should be configured to deliver MT services to the UE 220 via the IMS network 214, when the UE 220 is registered to IMS via the IMS HNB 218 and when the MT service is supported by IMS.

The IMS HNB 218 sends an Iu Release Request at step 914 and the Iu signalling connection is released, step 916. The IMS HNB 218 maps the received Setup message to an IMS session request (SIP Invite message) and sends this IMS session request (SIP Invite message) to the IMS network 214, step 918.

The call is connected with normal interworking procedures between SIP and TS 24.008 such that SIP signalling is translated to the UE signalling, at step 920.

The user plane is established at step 922. The IMS HNB gateway 216 remains in the user plane path and serves as an anchor for the duration of the voice call. In the event that the UE 220 moves so that a handover to a macro cell (such as cell 204) is initiated, the IMS HNB gateway 216 redirects the user plane from the IMS HNB 218 to the MSC 208 as will be explained in more detail below with reference to FIG. 11.

Referring now to FIG. 10, when a UE 220 camps on (or is attached to) an IMS HNB 218 and is successfully registered to IMS, then MT voice calls are expected to arrive through IMS. In such cases, an IMS session request (SIP Invite request) is received by the IMS HNB gateway 216, which is relayed to the IMS HNB 218 (step 1002) and then interworked to deliver the call to UE 220 via normal Call Connection (CC) procedures such as TS 24.008 CC procedures. As shown in FIG. 10, all these CC procedures are supported by the IMS HNB 218.

When a MT voice call request arrives through the CS domain (e.g. when another UE from a macro cell initiates a voice call to UE 220 in the CSG cell 222), then, either the call can be delivered to UE 220 by using the normal CS call control procedures (via Iu-cs interface), or the call can be redirected to IMS by using e.g. CAMEL triggers as specified in TS 23.078, the disclosure of which is incorporated herein by reference. The UE 220 can be provisioned with Terminating CAMEL Subscription Information (T-CSI) in the HSS so that, when a MT call arrives at the MSC 208, a forwarding number is obtained from GSM Service Control Function (gsmSCF) and the MSC 208 forwards the call to this number, which points to an IMS network element that further delivers the call to UE 220 via the IMS HNB Gateway 216 and IMS HNB 218.

Referring now to FIG. 11, the mobility of voice calls to a macro cell (such as cell 204) is supported by using the E interface between the IMS HNB gateway 216 and the MSC 208. FIG. 11 shows the main steps involved when a voice call is handed over from the IMS HNB 218 to a UTRAN/GERAN macro cell supporting voice on the CS domain. Similar steps are used when the UE 220 has a voice call and a non-voice component (in the PS domain) concurrently.

At step 1100, the UE 220 has an ongoing voice call established as described above with reference to FIG. 9 or FIG. 10. The IMS HNB 218 is configured with a list of neighbour macro cells (as specified in TS 25.467, the disclosure of which is incorporated herein by reference) and instructs the UE to measure the neighbour cells and transmit measurement reports as per the normal procedures specified in TS 25.331.

The UE 220 is arranged to take measurements of the neighbour cells, for example by measuring the signal strengths and/or quality of any signals received by the UE 220 from the neighbouring cells, at step 1102. From the measurements, it can be determined which cells are available for communication. For example, only those cells with signals measured to be of sufficient strength to support a voice call would be able to route services successfully to and from the UE 220.

Based on the measurement reports and on other implementation-based criteria (e.g. the traffic of neighbour cells), the IMS HNB 218 decides to handover the ongoing call to a neighbour macro cell (either UTRAN or GERAN), step 1104. In the example, the macro cell 204 is determined by the IMS HNB 218 to be a target cell for the handover.

The IMS HNB 218 sends a Relocation Required message to IMS HNB gateway 216 identifying the target cell, step 1106. Based on the target cell identity and preconfigured data, the IMS HNB gateway 216 selects an MSC (208 in this example) and starts, at step 1108, an inter-MSC handover with this MSC 208 as per TS 23.009, the disclosure of which is herein incorporated by reference. The MSC 208 prepares the appropriate resource in the target cell, step 1110, and sends a Prepare HO Response at step 1112 to IMS HNB gateway 216 including a HO number. Subsequently, a call is setup towards the HO number and then a Relocation Command is sent to the IMS HNB 218, at step 1114.

The IMS HNB 218 sends a regular HO Command message as specified in TS 25.331 (the disclosure of which is herein incorporated by reference) to the UE, identifying the target cell 204, at step 1116.

The UE 220 moves to the target cell 204 at step 1118 and the handover detection & completion takes place as per TS 23.009 in step 1120.

When the handover is completed, the MSC 208 sends (step 1122) an Answer message to the IMS HNB gateway 216, which triggers the user plane redirection. In addition, the IMS HNB gateway 216 (at step 1123) releases the call leg with the IMS HNB 218 that was established during the call origination (step 918 in FIG. 9).

The IMS HNB gateway 216 stops sending user plane data to the IMS HNB 218 and instead forwards (step 1124) all received data to the MSC 208, which further delivers this data to UE through the target macro cell 204, step 1126. Thus, the IMS HNB gateway 216 acts as an user plane anchor for a voice call that was originated by the UE 220 in the CSG cell 222 but which has now been handed over to the macro cell 204.

When the voice call is over at step 1128 and the UE 220 is still in a macro cell, the IMS HNB gateway 216, for example by means of an IMS deregistration element in the IMS HNB gateway 216, may trigger an IMS deregistration procedure at step 1130 whereby the UE 220 is deregistered from the IMS network 214 and the IMS registration information for the UE 220 is deleted from the memory 304 of the IMS HNB 218.

In general, when the UE 220 leaves the CSG cell 222 there is a need to deregister the UE 220 from IMS. In the case when the UE 220 leaves the CSG cell 222 during an active voice call, the IMS deregistration is performed after the call is finished in the macro cell 204, as shown in 1128 of FIG. 11. In the case the UE 220 leaves the CSG cell 222 in idle mode (when no service is active), several alternatives can be used to trigger the IMS deregistration. In one example when the IMS HNB 218 includes an IMS deregistration element, IMS HNB 218 can be configured to periodically page (or send paging messages to) the UE 220 and trigger IMS deregistration when the UE does not respond (e.g. the UE has moved to the macro cell 204). The paging rate in this case should be very small to avoid a negative impact on battery consumption. In another example when the IMS HNB gateway 216 includes an IMS deregistration element, as shown in FIG. 12, the UE 220 is provisioned with Mobility Management (MM) CAMEL Subscription Information (M-CSI) in the HSS, as specified in TS 23.078, the disclosure of which is incorporated herein by reference. After the UE 220 moves to the macro cell 204, it starts the normal Location Updating procedure at step 1200. During this procedure the VLR receives the M-CSI from the HSS, if this information is not already known to the VLR (e.g. from a previous Location Updating). As specified in TS 23.078, M-CSI includes a gsmSCF address and several MM events, such as Location Update, IMSI attach, etc. In this case, only the Location Update event is required and a gsmSCF address that points to the gsmSCF function in the IMS HNB Gateway 216. The MSC 208 sends a MAP MM Notification message (as specified in TS 29.002) to IMS HNB Gateway 216 in step 1202 to report that the Location Update procedure has been completed. In turn, the IMS HNB Gateway 216 triggers the IMS deregistration procedure at step 1204 such that the UE 220 is deregistered from the IMS network 214 and the IMS registration information for the UE 220 is deleted from the memory 304 in the IMS HNB 218.

In summary, the IMS HNB subsystem in accordance with the disclosure enables services to be provided to a UE via an IMS network. The IMS HNB subsystem can select the IMS network over another network to provide a service and the selection may be based on the service to be provided. Thus, for example, the IMS HNB subsystem can select the IMS network rather than a CS network to provide a voice call between the UE and a calling or called party. This enables CS traffic to be offloaded to the IMS network.

The IMS HNB subsystem in accordance with an example implementation of an embodiment of the invention has IMS capability in order to facilitate the routing of the services via the IMS network. The IMS capability may be provided by elements including a IMS registration element for registering an UE with the IMS domain and storing the IMS registration information for subsequent use in the provision of services to the UE and an interworking element for interworking (e.g. translating) the UE signalling with the IMS signalling and a route selection element for selecting a route for providing a service. By storing the IMS registration information in the IMS HNB 218 and by having the interworking element, the IMS HNB subsystem in accordance with the invention enables the IMS HNB subsystem to provide a service to the UE via the IMS network even when a UE has no IMS capability.

Since the IMS functionality of the IMS HNB 218 and IMS HNB gateway 216 described above is provided by software elements, existing IMS HNBs and IMS HNB gateways may be modified by software upgrades to provide the IMS capability as described above.

It will be appreciated that the core network 206 may manage additional or alternative radio access networks RANs to the UTRAN 202. Examples of other RANs include GSM access network (including GSM/EDGE RAN (GERAN)), CDMA 1X, CDMA EV-DO, HSPA (HSDPA/HSUPA) access networks, WLAN access network, Wi-Max access network, Evolved-UTRAN (E-UTRAN). Each of the RANs may include CS elements and PS elements.

In the foregoing specification, the invention has been described with reference to specific examples of embodiments of the invention. It will, however, be evident that various modifications and changes may be made therein without departing from the broader scope of the invention as set forth in the appended claims.

Some of the above embodiments, as applicable, may be implemented using a variety of different processing systems. For example, the Figures and the discussion thereof describe an exemplary architecture which is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between program elements are merely illustrative and that alternative embodiments may merge elements or impose an alternate decomposition of functionality upon various elements.

The invention claimed is:

1. A private base station comprising:
a processing unit coupled to a transceiver,
the transceiver configured to intercept messages between a wireless communication terminal (UE) and a circuit switched (CS) network;
the processing unit configured to create a security context for the UE when the UE is successfully authenticated by the CS network and to configure the transceiver to intercept further messages using the security context;
the processing unit configured to create an IP Multimedia Subsystem (IMS) identity for the UE if the UE is authenticated by the CS network, and the processing unit configured to register the UE with an IMS network using the IMS identity;

the processing unit configured to cause the transceiver to establish a signaling connection with the CS network when the UE sends a service request for the CS network;

the processing unit configured to cause the transceiver to send an IMS session request to the IMS network and to not forward a service request by the UE to the CS network when the IMS network can accommodate the service request, wherein the IMS session request corresponds to the service request; and the processing unit configured to cause the transceiver to release the signaling connection with the CS network after the session request is sent to the IMS network.

2. The private base station of claim 1, wherein the processing unit comprises an IMS registration element configured to create the IMS identity for the UE by mapping a CS identity of the UE to the IMS identity.

3. The private base station of claim 1, wherein the processing unit is configured to store IMS registration information for the UE at the private base station.

4. The private base station of claim 1, wherein the processing unit is configured to cause the transceiver to signal a handover message to the UE for handover to the CS network and to deregister the UE with IMS network after signaling the handover message.

5. The private base station of claim 4, wherein the processing unit is configured to cause the transceiver to periodically send paging messages to the UE, and the processing unit is configured to initiate IMS deregistration when no response to the paging messages is received from the UE.

6. The private base station of claim 1, wherein the processing unit is configured to initiate deregistering the UE with the IMS network when an ongoing service provided by the IMS network is complete.

7. The private base station of claim 1, wherein the processing unit is configured to initiate a communication handover of the UE from a communication cell defined by the private base station to another cell when the UE leaves the communication cell defined by the private base station.

8. The private base station of claim 1, the processing unit configured to cause the transceiver to respond to page messages from the CS network on behalf of the UE.

9. A method in a private base station, the method comprising:

intercepting messages between a wireless communication terminal (UE) and a circuit switched (CS) network using a security context for the UE;

creating an IP Multimedia Subsystem (IMS) identity for the UE using a CS identity of the UE if the UE is authenticated by the CS network;

registering the UE with an IMS network using the IMS identity;

sending an IMS session request to the IMS network if a service request by the UE to the CS network can be accommodated by the IMS network, wherein the IMS session request corresponds to the service request;

establishing a signaling connection with the CS network when the UE sends a service request for the CS network;

sending an IMS session request to the IMS network and not forwarding the service request to the CS network when the service request can be accommodated by the IMS network, wherein the IMS session request corresponds to the service request; and releasing the signaling connection with the CS network after the session request is sent to the IMS network.

10. The method of claim 9 further comprising creating the IMS identity for the UE by mapping the CS identity of the UE to the IMS identity.

11. The method of claim 9 further comprising storing IMS registration information for the UE at the private base station.

12. The method of claim 9 further comprising deregistering the UE with IMS network after the private base station sends a handover message to the UE for handover to the CS network.

13. The method of claim 12 further comprising periodically sending paging messages to the UE and initiating IMS deregistration when no response to the paging messages is received from the UE.

14. The method of claim 9 further comprising deregistering the UE with the IMS network when an ongoing service provided by the IMS network is complete.

15. The method of claim 9 further comprising initiating a communication handover from a communication cell defined by the private base station to another cell when the UE leaves the communication cell defined by the private base station.

16. The method station of claim 9, further comprising responding to paging messages from the CS network on behalf of the UE.

* * * * *